117,157

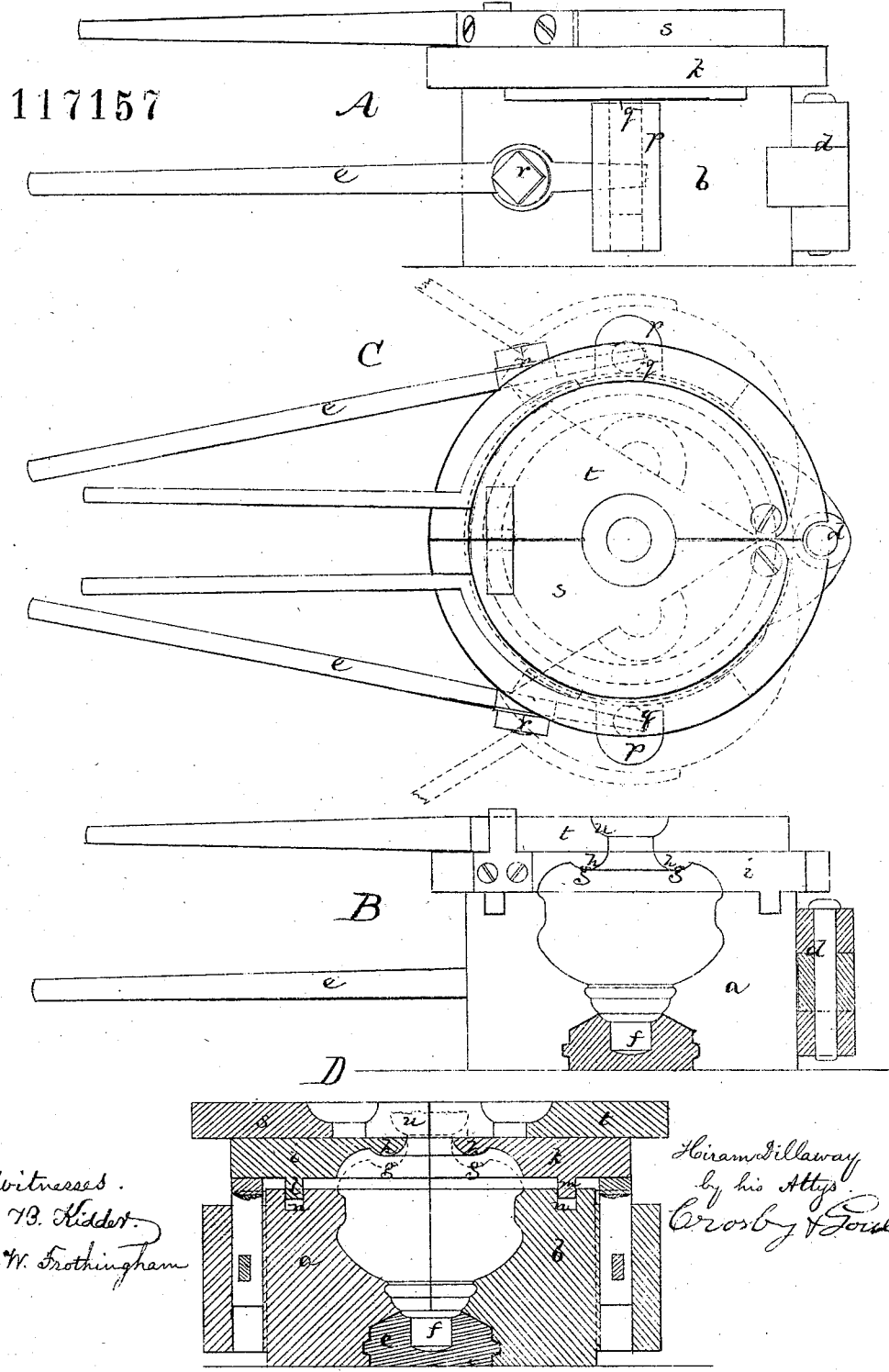

UNITED STATES PATENT OFFICE.

HIRAM DILLAWAY, OF SANDWICH, MASSACHUSETTS.

IMPROVEMENT IN MOLDS FOR GLASS LAMPS.

Specification forming part of Letters Patent No. 117,157, dated July 18, 1871.

*To all whom it may concern:*

Be it known that I, HIRAM DILLAWAY, of Sandwich, in the county of Barnstable and State of Massachusetts, have invented an Improvement in the Manufacture of Blown-Molded Glass-Lamps, &c.; and I do hereby declare that the following, taken in connection with the drawing which accompanies and forms part of this specification, is a description of my invention, sufficient to enable those skilled in the art to practice it.

My invention relates to an improved method of forming in jaw, or open-and-shut molds, blown-glass lamps, and other articles in which there are one or more depressions or recesses in the top surfaces, my improvement consisting in making each jaw or side of the mold in sections, the jaws or jaw-sections that form the upper part in which is the depression having an upward as well as an open-and-shut movement, and so that as the main jaws are opened the top jaws will also open, but with an upward movement that will lift the recess-forming projections out of the recesses to permit the jaws to open. The top jaws may be opened and made to rise by hinging them to the main jaws; but I prefer to so connect them with the handles that open the main jaws that, by tipping said handles slightly before spreading them, the top jaws will be raised sufficiently to allow both sets of jaws to open together.

The drawing represents a mold embodying my invention. A shows a side view of the mold closed. B is a central section of it. C is a plan of it, showing in dotted lines the position of the blow-over jaws. D is a central cross-section of the mold with the top jaws raised preparatory to opening the main jaws.

*a b* denote the two main jaws, or those that mold the sides of the lamp blown against them. At the lower part of the mold there may be a center piece, *c*, for receiving the peg *f* to be united to the bottom of the lamp-body. The two jaws, *a b*, are hinged together at *d*, and open and shut in the ordinary manner, each jaw having a handle, *e*, by means of which the jaws are operated. The top of the lamp or other article to be formed in the mold is to have an annular depression or recess, *g*, to form which the mold must have a corresponding projection, *h*, which it will be obvious it cannot have if this projection forms a part of the main mold, as the presence of the glass forms a bar to the opening of the projections. To obviate this difficulty I make the upper part of the mold, upon which are formed the projections *h*, as an auxiliary mold with two jaws, *i k*, and these jaws I connect with the main jaws by pins or flanges *l m*, which pins project from the jaws *i k* into holes or recesses *n* in the main jaws, as seen at D. The jaws *i k* rest lightly upon the jaws *a b*, and by means of the pins and these holes the jaws *i k* can rise so as to be free from the glass. To raise the jaws *i k*, each stands on a vertical pin, *p*, which pins slide in studs *q* at the sides of the mold. Into a slot in each of these pins the inner end or arm of one of the levers or handles *e* extends, and each lever-handle is attached to its jaw *a* or *b* by a pivot, *r*, so that by tipping the lever on said pivot the jaws *i k* are raised, as seen at D. At the top of the mold are two jaws, *s t*, that form the blow-over *u* on top of the lamp or other article. All the jaws being closed, the metal on the blow-pipe (introduced into the open mold) is blown out to the inner or molding-surfaces thereof, the peg *f* being placed in the center piece *c* to blow the glass upon it. When the blowing is finished the jaws *s t* are thrown open, releasing the blow-over neck, prior to which opening the jaws *i k* cannot be opened or raised. The levers *e* are then slightly depressed so as to lift the jaws *i k* above the recesses *g*, and the levers are then thrown outward, opening both the jaws *a b* and the jaws *i k*, when the lamp or other article can be removed from the mold.

I claim—

1. In combination with the main jaws *a b*, jaws *i k*, which form a recess or recesses in the top of the article, and which have an upward as well as an outward or opening movement.

2. The levers *e*, connected to the jaws *a b* by pivots *r*, and constructed and arrranged to lift the jaws *i k*, substantially as described.

3. The process of forming the top-recessed lamp or other article by means of lifting and hinged top jaws and main side jaws, substantially as described.

4. The top-recessed blown lamp or other article formed by the lifting and hinged jaws, substantially as described.

HIRAM DILLAWAY.

Witnesses:
LUTHER DRAKE,
JOSEPH L. ROGERS.